US010533385B2

(12) United States Patent
Kutryk

(10) Patent No.: US 10,533,385 B2
(45) Date of Patent: Jan. 14, 2020

(54) DUAL DECK VIBRATORY SEPARATOR

(71) Applicant: DRILLING FLUIDS TREATMENT SYSTEMS INC.

(72) Inventor: Edward A. Kutryk, Calgary (CA)

( * ) Notice: Subject to any disclaimer, the term of this patent is extended or adjusted under 35 U.S.C. 154(b) by 309 days.

(21) Appl. No.: 15/174,824

(22) Filed: Jun. 6, 2016

(65) Prior Publication Data

US 2016/0356108 A1 Dec. 8, 2016

Related U.S. Application Data

(60) Provisional application No. 62/171,867, filed on Jun. 5, 2015.

(51) Int. Cl.
*B01D 33/03* (2006.01)
*B01D 33/41* (2006.01)
(Continued)

(52) U.S. Cl.
CPC ............ *E21B 21/065* (2013.01); *B01D 33/03* (2013.01); *B01D 33/0346* (2013.01);
(Continued)

(58) Field of Classification Search
CPC ......... B07B 1/4609; B07B 1/28; B07B 1/286; B07B 1/4645; B07B 1/46; B07B 1/42; B07B 1/4663; B07B 1/4618; B07B 1/55; B07B 2230/01; B07B 2201/00; B07B 2201/04; B07B 2201/204; B07B 2201/02; B07B 13/16; B07B 13/18; B07B 1/4681;
(Continued)

(56) References Cited

U.S. PATENT DOCUMENTS 4,923,597 A * 5/1990 Anderson ............... B07B 1/005
209/315
6,155,428 A * 12/2000 Bailey ................ B01D 33/0346
209/315
(Continued)

FOREIGN PATENT DOCUMENTS

GB         2497873 A      6/2013

OTHER PUBLICATIONS

First office action for Canadian counterpart Appl. 2,932,099, dated Mar. 16, 2017, 4 pages.

*Primary Examiner* — Benjamin L Lebron
(74) *Attorney, Agent, or Firm* — Parlee McLaws LLP; C. F. Andrew Lau

(57) ABSTRACT

A dual deck vibratory separator is provided having an improved mud flow path that provides for higher flow capacities overall is provided. The shaker has a lighter basket possessing a full-size upper deck extending across the width and length of the basket. Operational efficiency and operability is improved with flow deflecting and energy absorbing plates disposed intermediate along the mud flow path. The screen assemblies are secured with improved wedges, improved wedge guides, screen cushions, and cushion stops on transverse structure members for longer screen and slide life. An optional vacuum tray on the finishing trays further enhances recovery of drilling fluid. Maintenance, when required, is improved through ease of upper screen removal for inspection and access. Inclined side windows on each side of the basket may provide cleaning and viewing access.

20 Claims, 10 Drawing Sheets

(51) Int. Cl.
  *B01D 33/72* (2006.01)
  *B01D 33/74* (2006.01)
  *B01D 35/20* (2006.01)
  *B07B 1/46* (2006.01)
  *E21B 21/06* (2006.01)

(52) U.S. Cl.
  CPC ......... *B01D 33/0376* (2013.01); *B01D 33/41* (2013.01); *B01D 33/72* (2013.01); *B01D 33/722* (2013.01); *B01D 33/74* (2013.01); *B01D 33/742* (2013.01); *B01D 35/20* (2013.01); *B07B 1/46* (2013.01); *B07B 1/4663* (2013.01); *B07B 1/4681* (2013.01); *B07B 2201/04* (2013.01); *B07B 2230/01* (2013.01)

(58) Field of Classification Search
  CPC ................................................. B01D 33/0346; B01D 33/0376; B01D 33/03; B01D 33/008; B01D 33/41; B01D 33/62; B01D 33/72; B01D 33/802; B01D 33/0353; B01D 33/0096; B01D 33/745; B01D 33/0116; B01D 35/20; B01D 19/0073; B01D 33/722; B01D 33/74; B01D 33/742; B32B 15/011; B32B 15/01; B32B 15/00; E21B 21/065; E21B 21/066; E21B 21/067; E02F 3/8816; E02F 3/907; B08B 15/02; F26B 5/12; F26B 20/00
  See application file for complete search history.

(56) References Cited

U.S. PATENT DOCUMENTS

| | | | | |
|---|---|---|---|---|
| 6,439,392 | B1* | 8/2002 | Baltzer | B01D 33/0376 209/405 |
| 6,530,482 | B1* | 3/2003 | Wiseman | B01D 33/0346 209/253 |
| 8,561,805 | B2* | 10/2013 | Scott | B01D 33/0315 209/555 |
| 2002/0139725 | A1* | 10/2002 | Bolton | B06B 1/16 209/421 |
| 2008/0078699 | A1* | 4/2008 | Carr | E21B 21/065 209/233 |
| 2013/0105412 | A1* | 5/2013 | Burnett | B07B 1/46 210/780 |

* cited by examiner

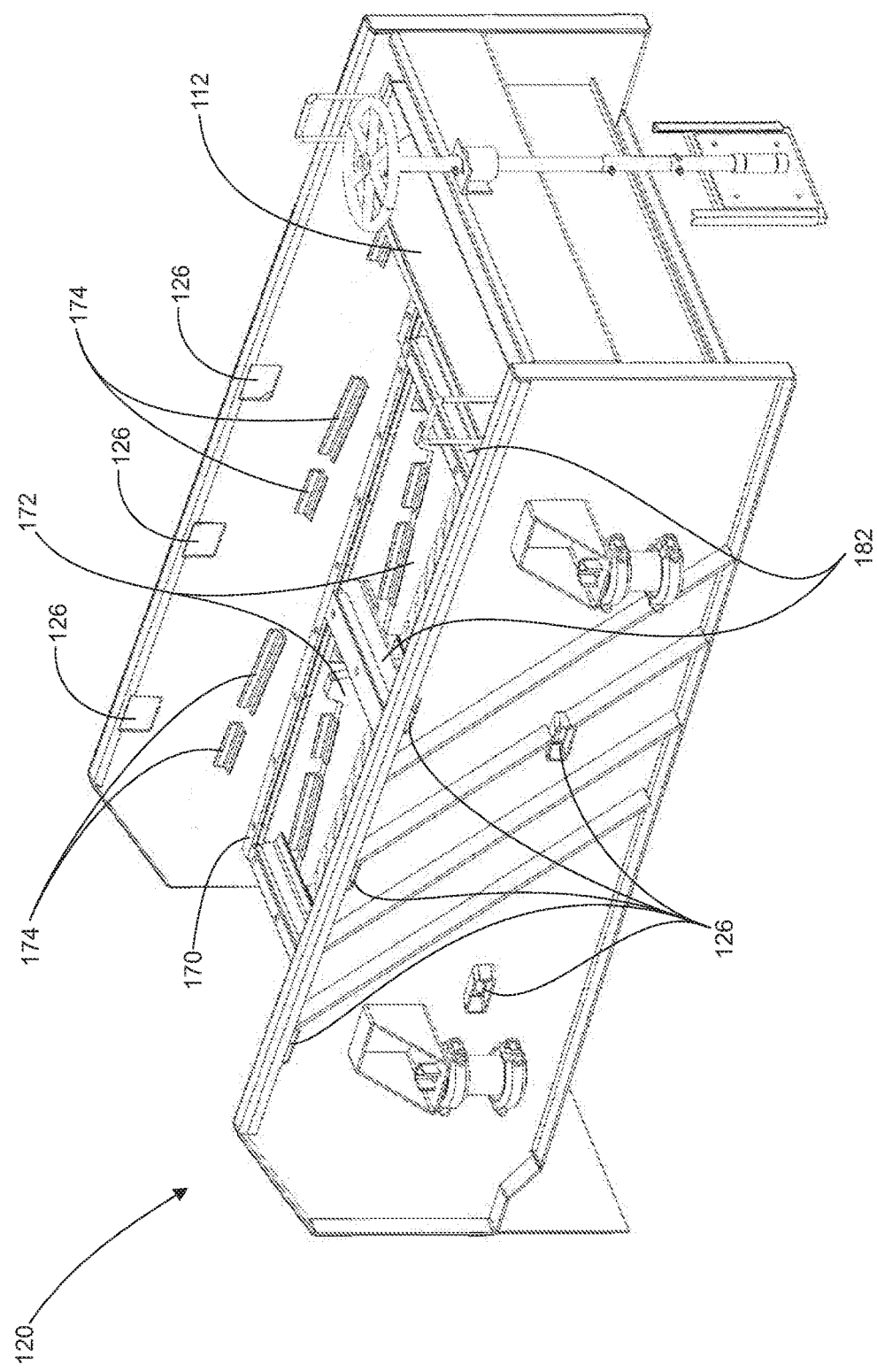

DUAL DECK VIBRATORY SEPARATOR

This application claims the benefit of U.S. Provisional Patent Application Ser. No. 62/171,867, filed Jun. 5, 2015, the entirety of which is incorporated by reference herein.

FIELD

The invention relates to vibratory separators such as a shaker for separation of solids from returned drilling muds and more particularly to improvements in processing efficiency.

BACKGROUND

Drilling mud is used while drilling oil and natural gas wells on a drilling rig to control subsurface pressures, lubricate the drill bit, stabilize the wellbore, and carry cuttings and other debris to the surface, among other functions. The drilling mud is pumped through a drill string and out of a drill bit, then returned to the surface through the annular space between the drill string and the wellbore. At the surface, cuttings and other solids entrained in the mud are typically separated from the mud by a vibrating screen separator called a shale shaker.

Shale shakers include a lower stationary base, called an underflow pan, and an upper vibratable basket that is connected to a high frequency linear angular motion or rotary vibratory motor. Mounted generally horizontally in the basket is a screen deck comprising one or more screen assemblies having one or more layers of tensioned screening material. In use, solids-laden mud flows onto one end of the screen deck, and solids retained by the screening material are conveyed by the vibratory action of the motor to the opposite end where they are discharged. Fluids and the smallest particles pass through the screening material and are collected in a tank system for further processing and reuse in the active system.

Screen assemblies include tensioned screening material attached to a rigid perforated plate, which is in turn attached to a generally rectangular structural frame. The perforated plate supports the screening material and contains a plurality of openings to permit the screened fluid to pass through the screening assembly. The frame is used to mount the screen assembly onto corresponding support slides of the basket and the sides of the screening assembly are secured thereto. For example, wedges can be wedged between the top periphery of the screen assembly and wedge supports extending inwardly from sides of the screen basket. The sides of the screening assembly are thereby securely sandwiched between the support slides and the wedges.

Typically, at least one deck of screen assemblies is provided. Sometimes a second, partial upper deck of coarse screens is provided, sometimes referred to as a scalping deck. Scalping decks are heavy because they include a full length tray thereunder which captures mud passing therethrough. The increased weight necessitates greater vibratory force from the motors in order to achieve the desired level of separation of solids from the drilling mud, which in turn can result in shortened screen life. Further, the screens are narrower than the apparatus width, which applicant understands may be due to weight considerations or to avoid mistaken placement of fine mesh lower screens in the upper deck locations. Further, due to the weight, vibratory effectiveness is reduced. Some operators remove the scalping deck in its entirety.

When dual decks are used, the narrow screens of the scalping deck, the increased weight, and other design factors lessen the effectiveness of the current vibrating apparatus.

There is a need in the art for an improved vibratory separator, including a separator that has an improved scalping deck.

SUMMARY

A dual deck vibratory shaker having an improved mud flow path that provides for higher flow capacities overall is provided. The shaker has a lighter basket possessing a full-size upper deck extending across the width and length of the basket. With multiple decks and large screen area, multiple and different gauges of mesh screens can be used. An optional vacuum tray on the finishing trays further enhances recovery of drilling fluid.

Operational efficiency and operability is improved with flow deflecting and energy absorbing plates disposed intermediate along the mud flow path. The screen assemblies are well secured with improved wedges, improved wedge guides, screen cushions and cushion stops on transverse structure members for longer screen and slide life.

Maintenance, when required, is improved through ease of upper screen removal for inspection and access. Inclined side windows on each side of the basket may provide cleaning and viewing access.

According to one aspect, there is provided a dual deck vibratory shaker for separating solids from drilling mud, comprising: a basket having a proximal end and a distal end, a first upper slide and first lower slide located on a first side wall of the basket, and a second upper slide and second lower slide located on a second side wall of the basket, the first and second upper slides running along a first plane and the first and second lower slides running along a second plane, an upper deck having a length, and extending from the proximal end to the distal end, comprising one or more removable upper screen assemblies on the first and second upper slides, a lower deck extending from the proximal end to the distal end, comprising one or more removable lower screen assemblies on the first and second lower slides, and a deflector plate extending from the first side wall and the second side wall underneath the first half of the length of the upper deck, or a part thereof, said deflector plate positioned to receive drilling fluid from the upper deck and to deliver the drilling fluid to the lower deck at the proximal end.

In one embodiment, there is also provided a first energy absorbing plate at the proximal end for receiving the drilling mud and directing the mud onto the one or more screen assemblies of the upper deck.

In one embodiment, a first of the one or more upper screen assemblies located nearest the proximal end is vertically higher than the remaining one or more upper screen assemblies.

In one embodiment, the first of the one or more upper screen assemblies is higher by a height of about one screen height.

In one embodiment, the deflector plate directs the drilling fluid onto a second energy absorbing plate located at the proximal end of the basket, before the drilling fluid is directed onto the lower deck.

In one embodiment, the deflector plate extends underneath the first third of the length of the upper deck, or a part thereof.

In one embodiment, the upper deck comprises three removable upper screen assemblies, and wherein the deflector plate extends underneath the first screen assembly located nearest the proximal end, or a part thereof.

In one embodiment, there is also provided one or more transverse support members, disposed underneath the upper deck and the lower deck, having a length, and extending from the first side wall to the second side wall of the basket.

In one embodiment, there is also provided at least one longitudinal cushion secured to each of the first and second upper slides and to each of the first and second lower slides.

In one embodiment, there is also provided at least one transverse cushion having a first height and secured to the one or more transverse support members.

In one embodiment, the longitudinal cushions and transverse cushions are secured by rivets.

In one embodiment, the longitudinal cushions are made of a resilient shock-absorbing material.

In one embodiment, the transverse cushions are made of a resilient shock-absorbing material.

In one embodiment, the resilient shock-absorbing material is polyurethane.

In one embodiment, there is also provided stops protruding vertically from both sides of the one or more transverse supporting members and extending along at least a portion of the length of the one or more transverse supporting members, said stops having a second height that is lower than the first height.

In one embodiment, the stops are continuous along the length of the one or more transverse supporting members.

In one embodiment, the stops are comprised of two or more discrete portions disposed along the length of the one or more transverse supporting members.

In one embodiment, the stops are made of a plastic.

In one embodiment, the plastic is polyethylene.

In one embodiment, there is also provided an enhanced recovery system fit to the one or more lower screen assemblies on the first and second lower slide.

In one embodiment, the enhanced recovery system comprises a vacuum system.

In one embodiment, the vacuum system is a pulsed vacuum system.

In one embodiment, there is also provided one or more angled view ports on the first and second side walls of the vibratory shaker.

According to one aspect aspect, there is provided a vibratory shaker for separating solids from returned drilling mud, comprising: a basket having a proximal end and a distal end, a first slide located on a first side wall of the basket, and a second slide located on a second side wall of the basket, the first and second slides running along a first plane, one or more upper transverse support members extending from the first side wall to the second side wall of the basket and underneath the first plane, and stops protruding vertically from both sides of the one or more upper transverse supporting members and extending along at least a portion of the length of the one or more upper transverse supporting members.

In one embodiment, there is also provided a third slide located on the first side wall of the basket below the first slide, and a fourth slide located on a second side wall of the basket below the second slide, the third and fourth slides running along a second plane that is below the first plane, one or more lower transverse support members extending from the first side wall to the second side wall of the basket and underneath the second plane, and stops protruding vertically from both sides of the one or more lower transverse supporting members and extending along at least a portion of the length of the one or more lower transverse supporting members.

In one embodiment, the stops are continuous along the length of at least one of the upper and/or lower transverse supporting members.

In one embodiment, the stops are comprised of two or more discrete portions disposed along the length of at least one of the upper and/or lower transverse supporting members.

In one embodiment, there is also provided a transverse cushion having a second height that is higher than the first height secured to at least one of the upper and/or lower transverse support members.

In one embodiment, the transverse cushions are secured by rivets.

In one embodiment, the transverse cushions are made of a resilient shock-absorbing material.

In one embodiment, the resilient shock-absorbing material is polyurethane.

According to one aspect, there is provided a method for retrieving drilling fluid from returned drilling muds using a dual deck vibratory shaker, comprising: securing one or more screen assemblies to an upper deck and a lower deck of a basket of the vibratory shaker, feeding the returned drilling mud onto the upper deck at a proximal end of the vibratory shaker, agitating the basket to separate solids and fluids of the returned drilling mud and direct the solids toward a distal end of the shaker, deflecting a first portion of the fluids which flow through the upper deck towards the proximal end of the shaker and onto the lower deck, collecting drilling fluid which flows through the lower deck, and retrieving the drilling fluid from the vibratory shaker.

In one embodiment, the deflecting step further comprises allowing a second portion of the fluids which flow through the upper deck to fall directly onto the lower deck.

In one embodiment, the feeding step further comprises directing the drilling mud onto a first energy absorbing plate before it is delivered onto the upper deck.

In one embodiment, the deflecting step further comprises directing the first portion of the fluids onto a second energy absorbing plate before it is delivered onto the lower deck.

In one embodiment, the retrieving step further comprises using an enhanced recovery system to draw fluids through the screen assemblies of the lower decks.

In one embodiment, the enhanced recovery system is a vacuum system.

BRIEF DESCRIPTION OF THE DRAWINGS

FIG. 3 is a perspective view of an embodiment of a basket, removed from the shaker with the screen assemblies and wedges removed from the decks;

DESCRIPTION

Figure 1:
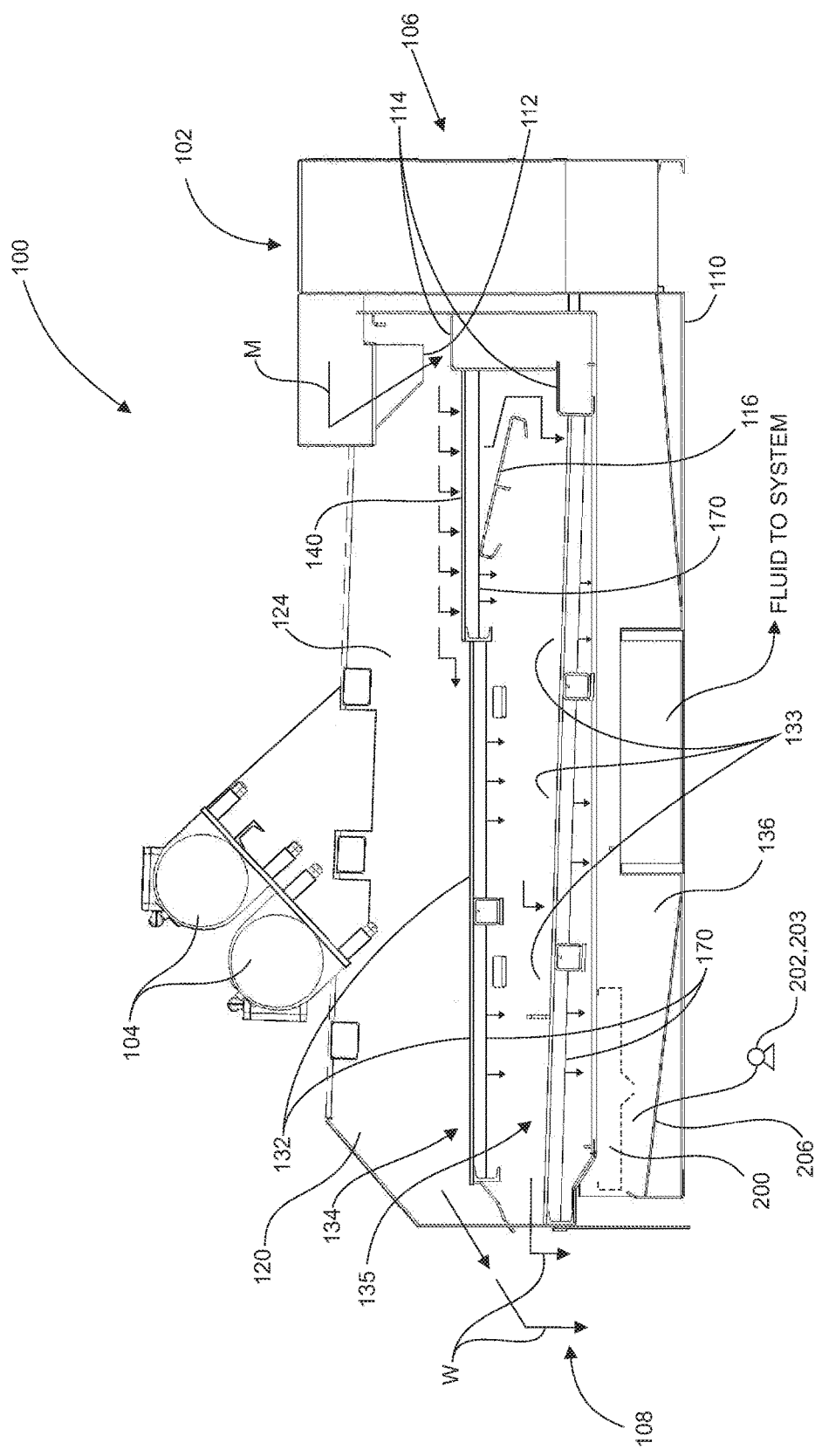
FIG. 1 is a cross-sectional representation of an embodiment of a dual deck vibratory shaker for separating entrained solids from fracturing mud, illustrating a vibrating basket, vibratory motors, mesh screen assemblies, screen decks, a deflector plate, and an enhanced fluid recovery system.

Described herein is a dual deck vibratory shaker 100 having an improved mud flow path that provides for higher flow capacities overall.

Shaker 100 comprises a deflector plate 116 disposed underneath only the first part of an upper deck 134 having a plurality of screen assemblies 132. Thus, the basket of the shaker 100 has a lighter weight than conventional baskets of dual deck shakers, in which a tray is disposed underneath the entire upper deck. In preferred embodiments of the shaker, the screen assemblies 132 of the upper deck extend across the width and length of the basket.

Drilling fluid flows through the screens of the upper deck onto the deflector plate 116, which delivers this fluid to a lower deck 135 below, which also has a plurality of screen assemblies 133. Fluid which does not flow through the upper deck screens onto the deflector plate 116, proceeds further along the upper deck, and flows through the screens, directly onto the lower deck screens. Remaining drilling fluid and solids are discharged off of the distal or discharge end 108 of the shaker.

The deflector plate 116 delivers the drilling fluid to the screen assemblies of the lower deck. Fluid on the lower deck, either received from the deflector plate 116 or directly from the upper deck 134, flows through the lower deck screens and is collected for reuse. Remaining fluid and solids are discharged off of the distal or discharge end 108 of the shaker.

Embodiments contemplate inclusion of energy absorbing plates 114 at the proximal or feed end 106 of the shaker, to absorb energy from fluid flowing from the mud feed tank 102 and/or the deflector plate 116, before these fluids are disposed onto the surface of the upper or lower deck screen assemblies, respectively.

Screen assemblies 132,133 may be secured in the basket using an improved combination of wedges 172 that are wedged between angled supports 174 and slides 170 disposed along the sides of the basket.

Transverse screen cushions 177 may be used to provide for longer life of components of the basket, in particular, the screen assemblies. In embodiments herein, the durability of the transverse screen cushions is improved by fitting transverse structural members 182 with cushion stops 180, which contact both sides of the transverse cushions 177. These stops reduce perpendicular shearing forces on rivets used to hold the cushions in place, thereby improving longevity of the cushions.

An optional vacuum tray 200 on the lower deck screen assembly further enhances recovery of drilling fluid. Maintenance, when required, may be improved in some embodiments through the use of inclined cleanout ports 126 on each side of the basket, to provide cleaning and viewing access.

Having thus described the basic apparatus, specific embodiments of the method and apparatus will now be described, as shown in the accompanying Figures.

With reference to FIG. 1, a side cross-sectional view of a dual deck vibratory shaker 100 embodiment illustrates a lower stationary base 110, including a mud feed tank 102 with a decanting overflow, discharging through an angled discharge spout 112 to an upper vibratable basket 120 connected to a high frequency linear angular motion or rotary vibratory motor 104. Mounted generally horizontally in the basket are dual decks of screen assemblies 132,133, each having one or more layers of tensioned screening material 168.

In use, in this embodiment solids-laden mud M flows into the feed tank 102 at a feed or proximal end 106 of the shaker 100. The mud overflows into a tray for distribution of the mud transversely across the width of the upper screen deck 134, which typically consists of a coarse screen material. Linear angular or rotary vibratory forces are applied to the basket 120, and hence the screen assemblies 132,133, to cause material on top of the screen assemblies to move generally longitudinally therealong from the feed or proximal end 106 of the basket 120 to the discharge or distal end 108 of the basket.

Large solids retained by the screen assemblies 132,133 on the upper and lower decks are conveyed by vibratory action to the distal end 108 where they are discharged as waste W. Fluids and smaller particles pass through the coarse screens of the screen assemblies 132,140 of the upper deck 134 and are directed to the finer mesh screens of the screen assemblies 133 of the lower deck 135.

Intermediate and small sized solids retained by the fine screen of screen assemblies 133 are conveyed by vibratory action to the far or distal end 108 where they are also discharged as waste W. Fluids and the smallest particles pass through the fine screens of screen assemblies 133 and are collected at least in a tank system 136 for further processing and reuse in the active system.

Of interest is the flow path of mud M. Leaving the feed tank 102, the mud M is distributed across the upper deck 134 at the proximal end 106 of the basket. An angled discharge spout 112 may direct the entire width of the feed stream against an energy absorbing plate 114 upstream of the coarse screen assemblies 132. Quieted mud M then flows onto the first coarse screen 140. The upper deck 134 is generally horizontal, however the basket angle can be adjusted from +4 to −2 degrees. In the embodiment depicted in FIG. 1, three full width screen assemblies (44" wide and 30" long) 132,132,140 are provided extending substantially the length of the basket 120 for a total screening area of about 27.5 sq. ft. Other embodiments may include fewer, or more, screen assemblies.

In the depicted embodiment, the first screen assembly 140 is supported slightly offset and vertically upwards of (above) the following or subsequent screen assembly 132, for ease of movement of the first screen assembly 140 over the subsequent screen assembly during inspection or screen replacement. This allows for convenient replacement of the screen of the first screen assembly 140, which tends to experience greater wear and require more frequent replacement due to it receiving the bulk of the returned mud M and entrained solids thereon. In embodiments, the offset of the first screen assembly 140 may be about the thickness of the screen's frame.

A majority of the volume of recoverable fluid from the mud M will pass through the first coarse screen assembly 140, typically about a 50 mesh screen (300 micron). The remaining mud M on the upper deck 134 traverses the remaining two coarse screen assemblies 132,132 for recovery of additional fluids therethrough, which fall directly to the lower deck 135. The coarse screen assemblies on the upper deck 134 enable more effective solids separation and are easily changed to compensate for variable material and drilling zone conditions.

An angled deflector plate 116, extending between the side walls of the basket 122, extends below the first course screen assembly 140 of the upper deck 134. Deflector plate 116 receives recovered fluid and directs this fluid back towards the feed or proximal end 106, on the lower deck 135, and in preferred embodiments onto a second energy absorbing plate 114 located at the shaker's proximal end 106.

Figure 4:
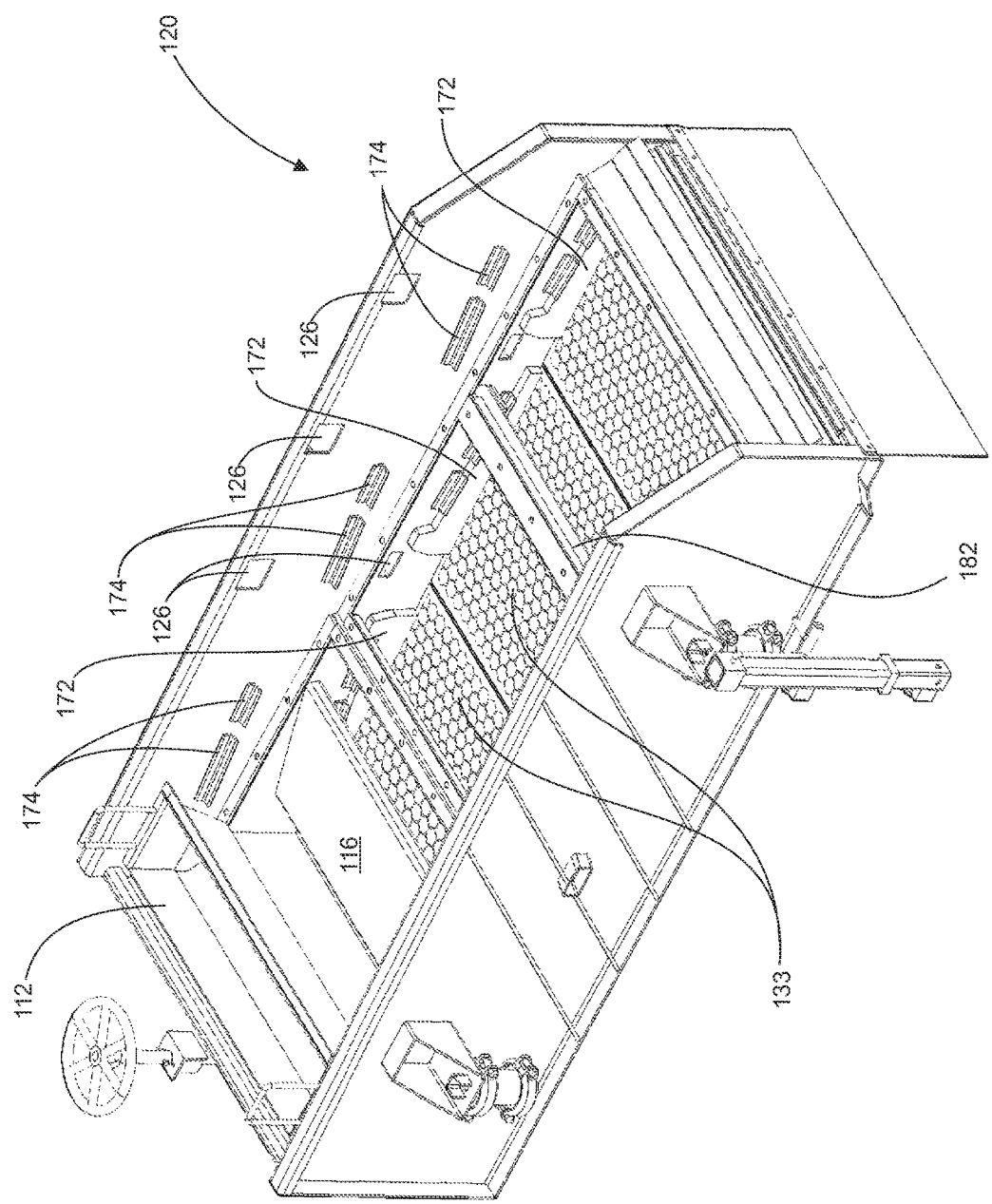
FIG. 4 is a perspective view of an embodiment of a basket removed from the shaker with the screen assemblies and wedges removed from the upper deck and screen assemblies installed on the lower deck and secured with wedges.
Figure 5A:
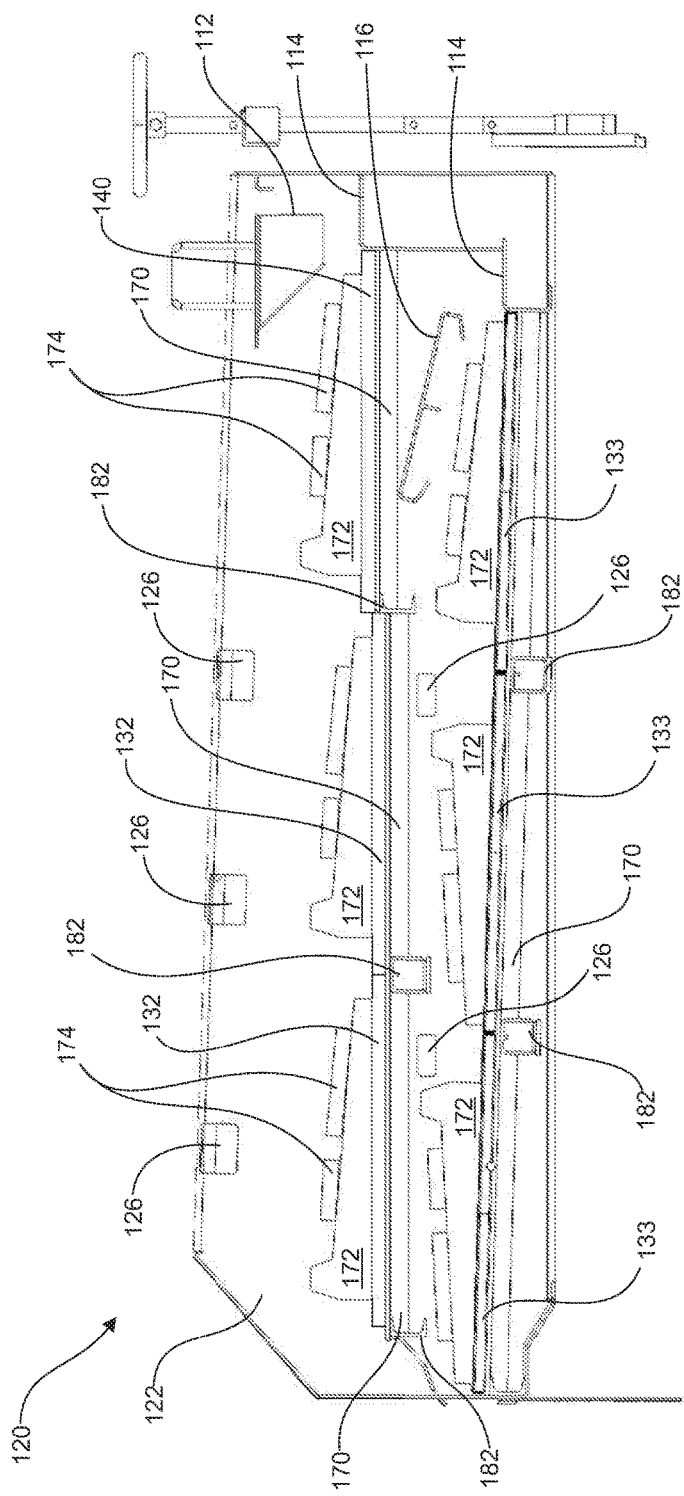
FIG. 5A is a side cross-sectional side view of an embodiment of a basket with screen assemblies installed on the upper and lower decks and wedges securing the screen assemblies thereto.

In preferred embodiments, and as shown in FIGS. 1, 4, and 5A, the deflector plate extends under the first screen assembly 140, or under a part of the first screen assembly, and fluids that flow through the other coarse screen assemblies 132,132 fall directly onto the lower deck 135. As a majority of the recovered fluid passes through the first course screen assembly 140, the deflector plate need extend only under this assembly in order to transfer this fluid to the lower deck 135. Basket 10 is therefore significantly lighter than a basket with a tray that extends underneath the entire upper deck 134. Thus, the inventors have discovered that, since the majority of the recovered fluid passes through the first portion of the upper deck, a tray that extends underneath the entire upper deck is not needed.

In the embodiments shown herein, deflector plate 116 extends underneath the first third, or part thereof, of length of the upper deck. Other embodiments contemplate that the deflector plate 116 extends underneath the first half, or part thereof, of the length of the upper deck. The angle of the deflector plate is selected to minimize the vertical distance between the upper deck 134 and lower deck 135, allowing for a correspondingly greater vertical distance between the upper deck and the tops of the side walls of the basket, in order to reduce the likelihood of mud on the upper deck 134 being expelled out of the basket 120 due to the vibratory action of the shaker.

As shown in FIG. 1, partially cleaned fluids may then be distributed by the deflector plate 116 transversely across the second energy absorbing plate 114 situated at the proximal end 106 of the shaker. These fluids may then flow onto fine screen assemblies 133 at the proximal end 106 of the lower deck 135. Other embodiments contemplate that the partially cleaned fluids are delivered from the deflector plate 116 directly onto fine screen assemblies 133 at the proximal end 106 of the lower deck 135.

In the embodiment shown in FIG. 1, three screen assemblies (44" wide and 30" long) 133,133,133 are provided which extend across the full width and along the length of the basket 120 for a total screening area of about 27.5 sq. ft. The fine mesh screens (such as 170 to 230 mesh; or 90 to 63 microns) on the lower deck 135 result in improved fluid recovery. An upward slope as the lower deck 135 approaches the discharge or distal end 108 permits longer retention time of fluids, resulting in drier waste cuttings.

Figure 2A:
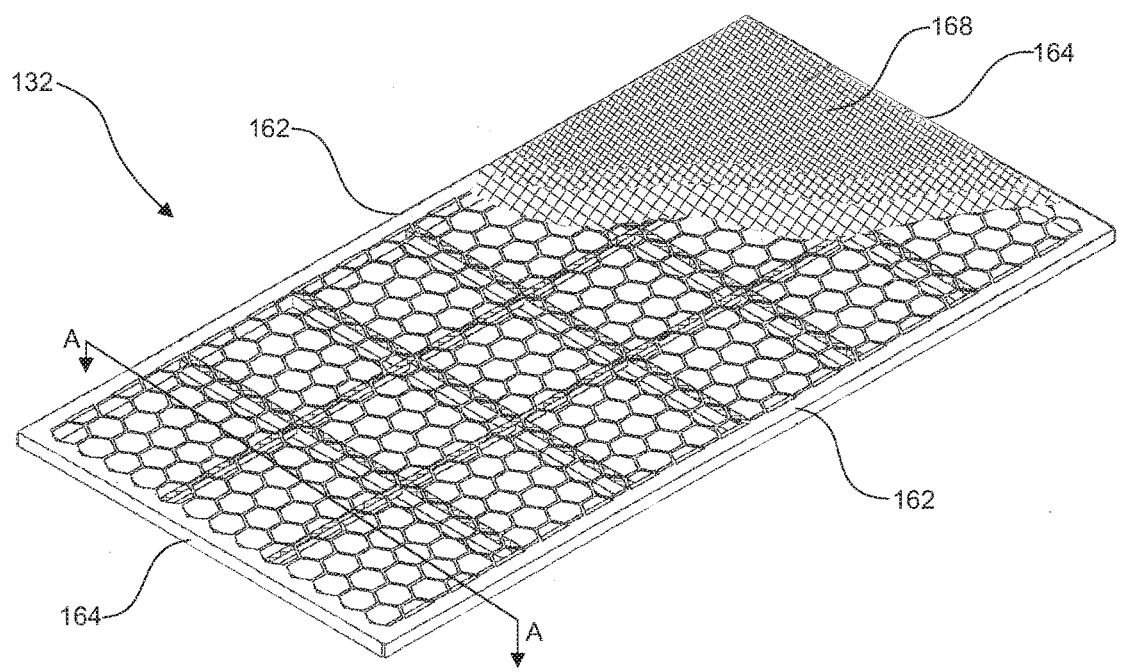
FIG. 2A is a perspective view of an embodiment of an assembled screen assembly with the screening material showing at the top left corner.
Figure 2B:
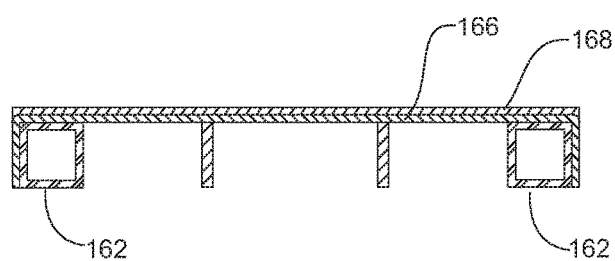
FIG. 2B is a cross-sectional side view of the assembled screen assembly of FIG. 2A along plane A-A.
Figure 2C:
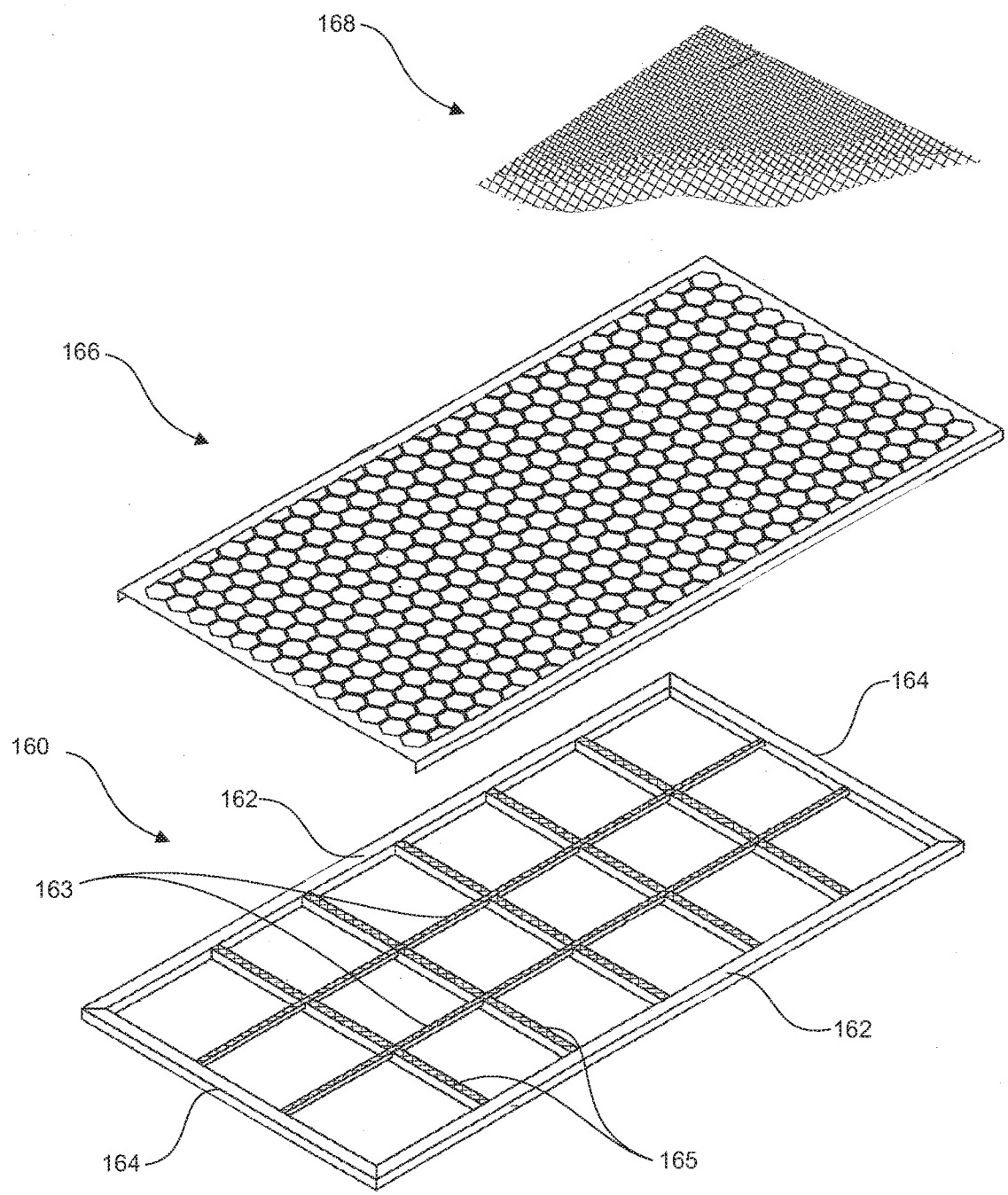
FIG. 2C is an exploded perspective view of the screen assembly of FIG. 2A, showing the frame, perforated plate, and screening material separately.
Figure 5B:
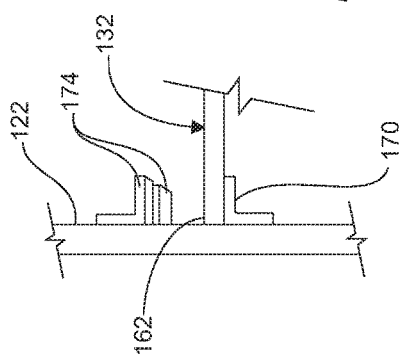
FIG. 5B is an end view of the side of the basket showing a screen assembly mounted on slides attached to the side wall of the basket.

As shown in FIGS. 2A to 2C, the screen assemblies 132,133 may comprise a generally rectangular outer frame 160, a perforated plate 166 attached to the frame 160, and one or more layers of screening material 168 supported on and/or attached to the perforated plate 166. The outer frame 160 may include a pair of spaced apart longitudinal side members 162, a pair of spaced apart transverse end members 164, and multiple intermediate longitudinal members 163 and transverse members 165 therebetween. As shown in FIGS. 5A and 5B, the screen assembly's longitudinal side members 162 are mounted on slides 170 which are connected to side wall 122 of the basket 120 of the vibratory separator 100.

Figure 7:
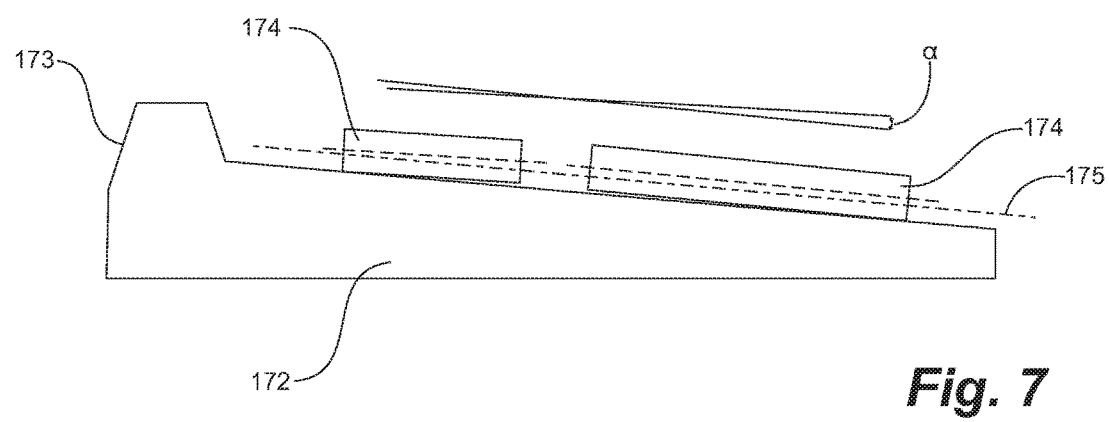
FIG. 7 is a side view of a hammerhead wedge located under embodiments of two angled wedge supports.

As shown in FIGS. 3 and 4, in one embodiment, slides 170 are mounted to the side walls 122 of the basket 120, and frames 160 of the screen assemblies 132,133 are supported on the slides 170. The screen assemblies 132,133 may be secured to the slide 170 by wedges 172. In a preferred embodiment, wedges 172 engage angled supports 174 situated above the screen assemblies 132,133, the base of the wedges pressing the screen frames 160 against the slides 170. Thus, the screen assembly longitudinal side members 162 are jammed or sandwiched between the slides 170, the wedge 172 and the angled supports 174. As shown in FIG. 7, the wedges 172 have a generally tapered hammerhead shape, the thick end 173 having a protrusion to enable striking with a hammer from either direction to drive the wedge 172 under the angled supports 174 or out from under the supports.

As shown in FIG. 5B, in one embodiment, the angled supports 174 are beams having L-shaped cross-sections with a first face welded, or otherwise fixed, to a side wall 122 of the basket 120, and the other face being generally perpendicular to the first face, and angled to support wedge 172 thereunder.

The wedge and retention thereof may be improved using a slightly arcuate support or two-part support. As best shown in FIG. 7, each pair of angled supports 174 are slightly angularly offset by offset angle $\alpha$ in opposing directions relative to each other to improve retention of the wedges 172. When a wedge 172 is driven into the angled supports 174, the angled supports 174 are slightly deformed, such that the planes of the supports 174 are generally parallel with the plane of the upper wedge face 175. Such deformation from their resting angles causes the angled supports 174 to apply a downward force to the wedge 172, thereby increasing frictional force F between the wedge 172 and supports 174, and between the wedge 172 and screen assemblies 132,133, further securing the wedge 172.

In alternative embodiments, the angled supports 174 can be slightly curved, with the convex side facing downward toward the wedge 172 (not shown). Such an arrangement further increases frictional force to retain the wedge 172 and resist unwanted movement. In such embodiments, the angled supports 174 can be one continuous member, or two or more discrete members with an angular offset relative to the plane of the upper wedge face 175 as described above.

In embodiments, further support for the screen assemblies 132,133 while in the basket is provided by means of transverse structural members 182, which extend between the side walls 122 of the basket. In preferred embodiments transverse structural members are positioned such that they will lie underneath the transverse end members 164 of the outer frame 160 of the screen assemblies and, in particular, underneath where the transverse end members 164 of two adjacent screen assemblies abut one another. This arrangement can be best seen in FIG. 6, which shows the transverse end members 164 of two adjacent screen assemblies (with the frame 160 removed) mounted above a transverse structural member 182.

Figure 6:
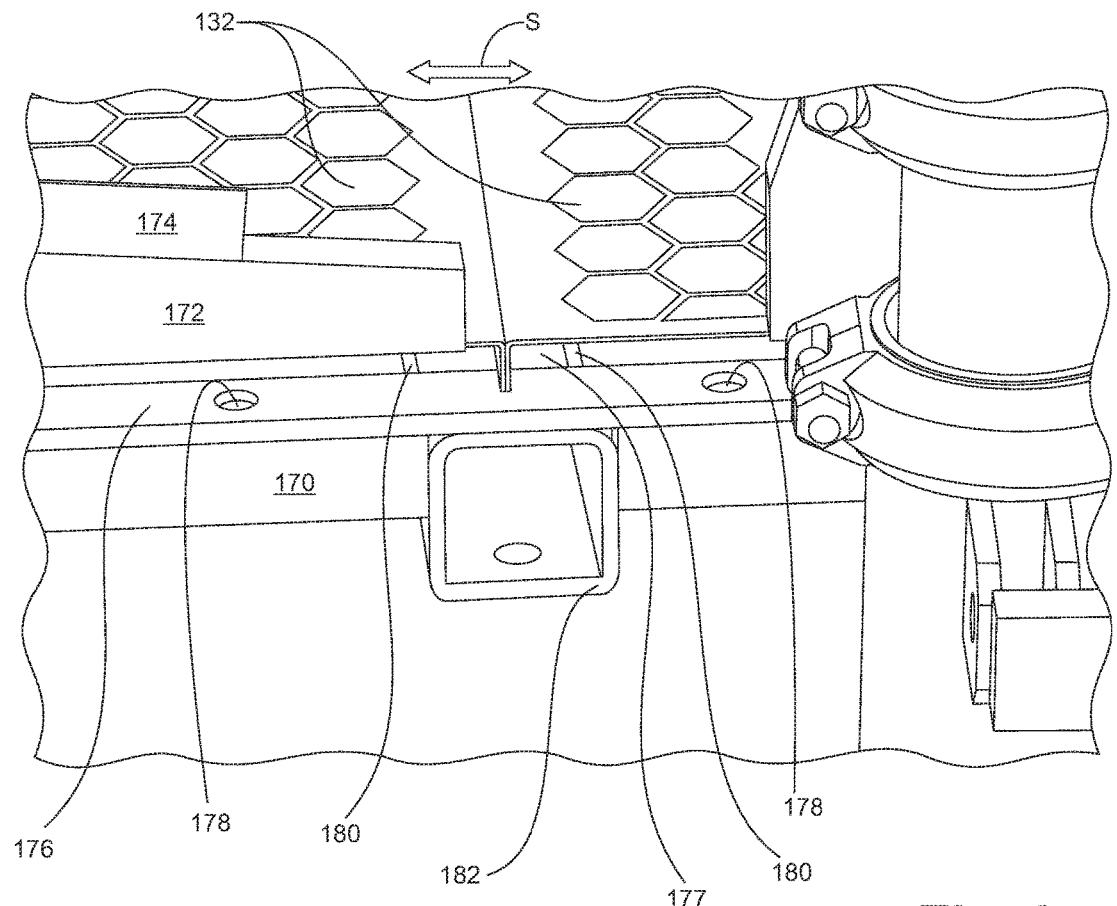
FIG. 6 is a perspective view of abutting screen ends, with the frame removed, supported on a transverse structural member and along a slide member. The transverse structural member is slightly crowned for further tensioning the screens.

As shown in FIG. 6, the slides 170 may be fit with longitudinal cushions 176, and the transverse structural members 182 of the basket 120 may be fit with transverse cushions 177. The cushions 176,177 are made of a resilient, shock-absorbing material such as polyurethane, and may be secured to the slides 170, or transverse structural members 182. In the depicted embodiment, longitudinal cushions 176 are secured to the slides by push rivets 178. As shown in FIGS. 8A through 10C, transverse cushions 177 may also be secured to the transverse structural members 182, for example, by rivets 178.

In preferred embodiments, transverse cushions 177 are secured to transverse structural members 182 using stops 180. As best shown in FIGS. 8A to 10C, the stops 180 may be secured to the side edges of transverse structural members 182 to straddle the cushion 177 and further support the transverse cushion 177 against perpendicular shearing forces S created by the movement of the screen assemblies 132,133 due to the vibratory action of the motor(s) 104.

Figure 8A:
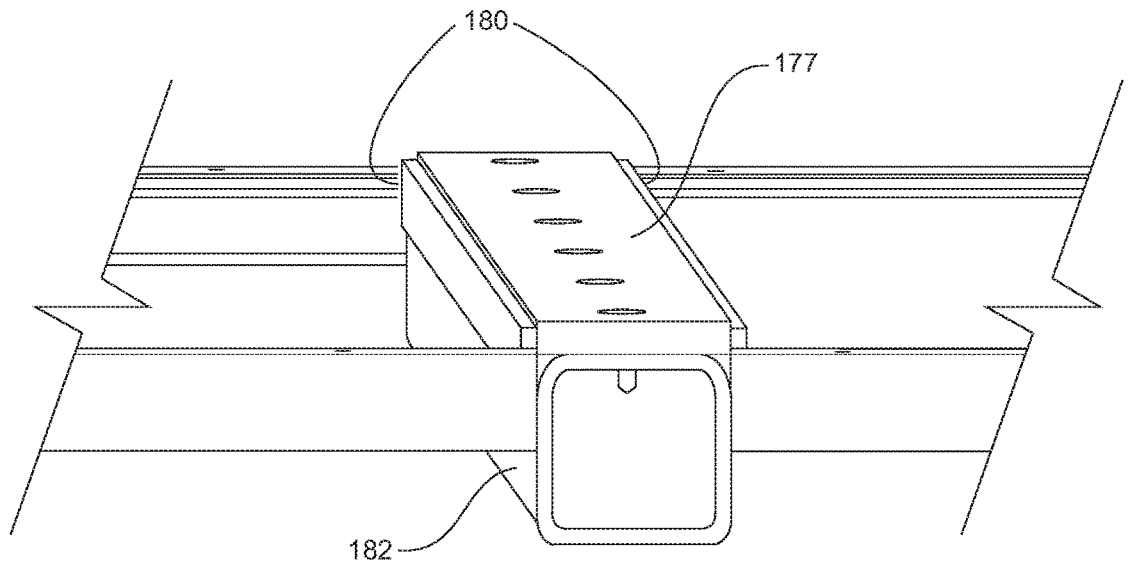
FIG. 8A is a perspective view of a transverse structural member with a cushion installed between embodiments of the stops of the member using rivets.
Figure 8B:
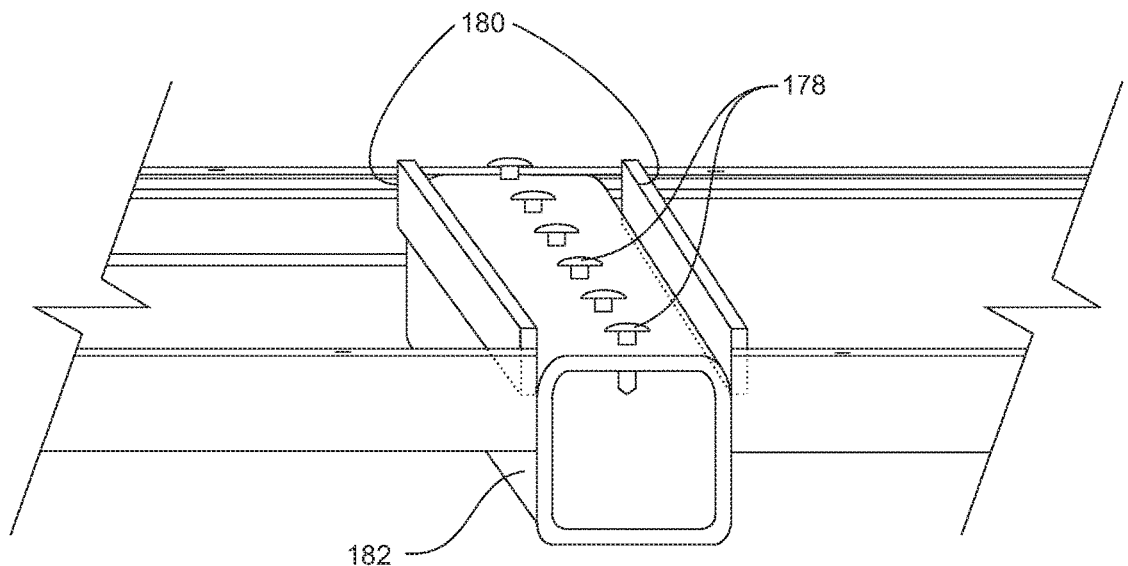
FIG. 8B illustrates a transverse structural member with the cushion removed.
Figure 9A:
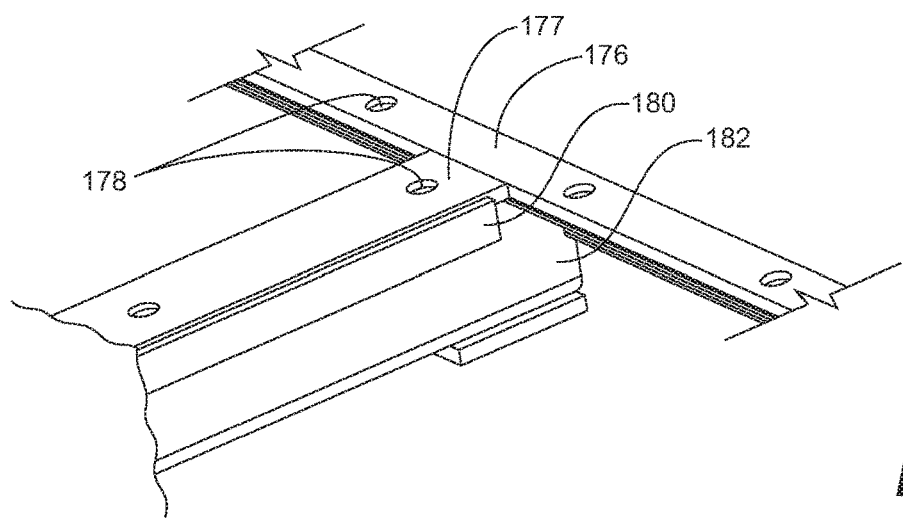
FIG. 9A is a perspective view of a transverse structural member with a cushion installed between embodiments of the stops of the member using rivets.
Figure 9B:
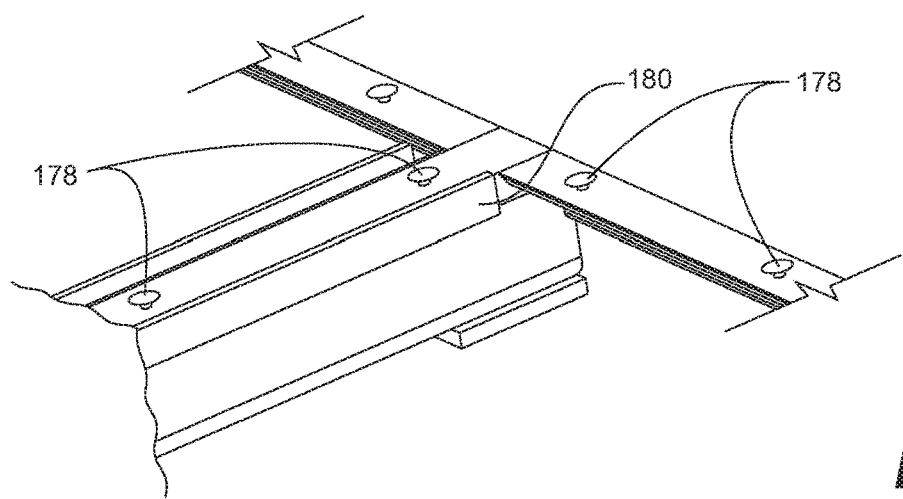
FIG. 9B illustrates the embodiment of FIG. 9A with the cushion removed.
Figure 9C:
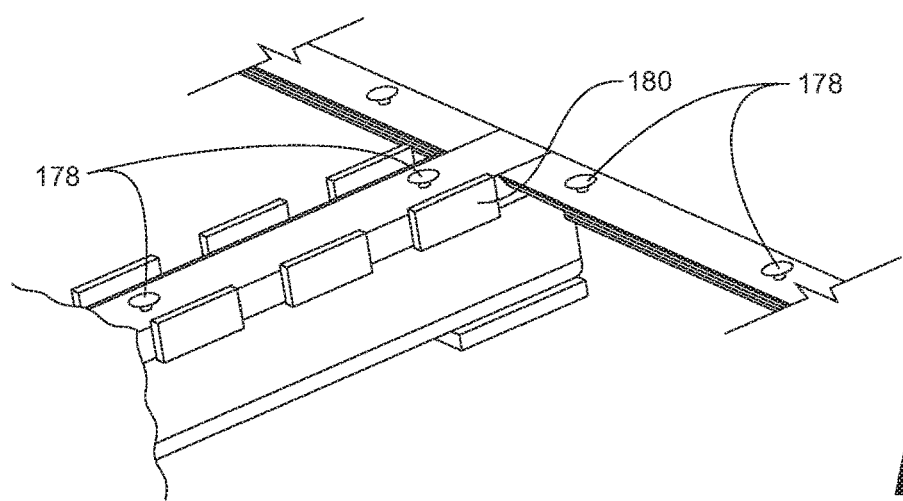
FIG. 9C illustrates the embodiment of FIG. 9A with the cushion removed, and the stops comprising multiple discrete portions.
Figure 10A:
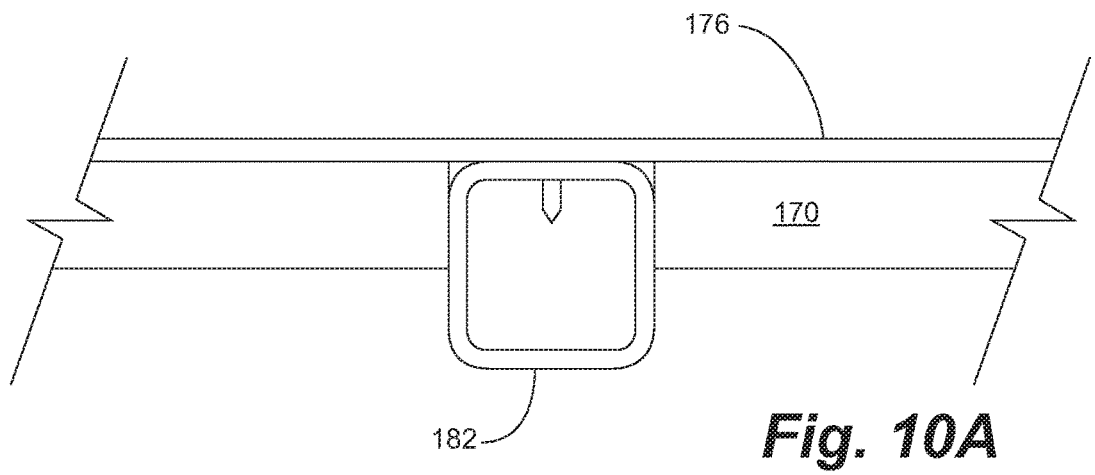
FIG. 10A is a side view of a longitudinal cushion installed along a slide member and secured by rivets.
Figure 10B:
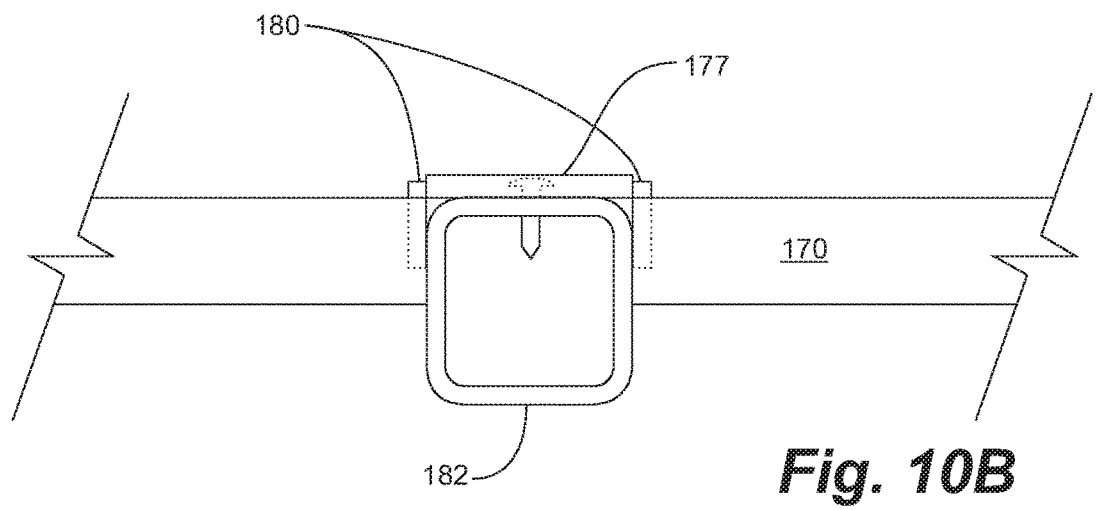
FIG. 10B is a side view of a transverse structural member with a cushion installed between the stops of the transverse member using rivets and the longitudinal cushion removed.
Figure 10C:
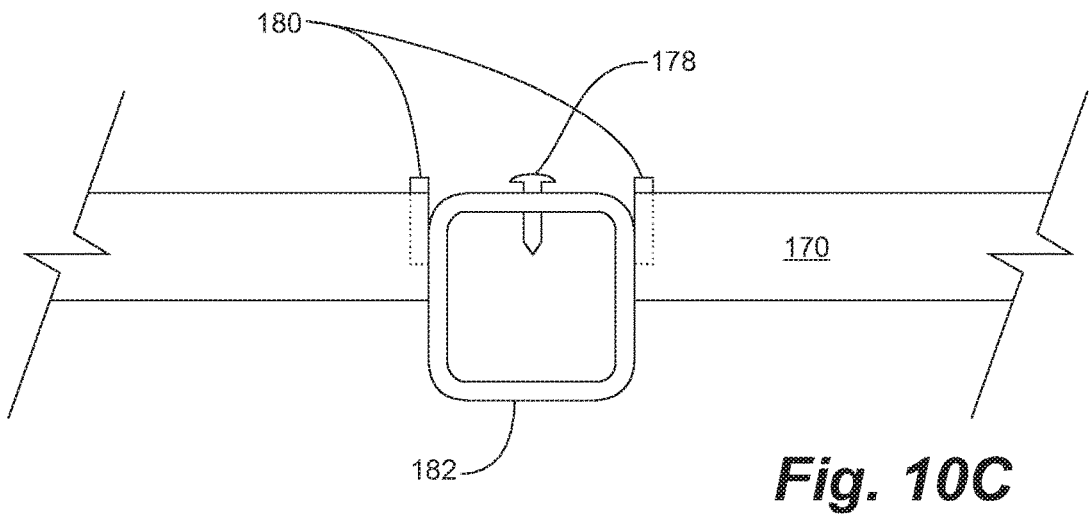
FIG. 10C is an illustration of the embodiment of FIG. 10B with the transverse cushion removed.

The stops 180 can be comprised of polyethylene or a similar material. The stops 180 stand upright, but, as shown in FIG. 8A or 10B, their height remains lower than the cushion's supporting surface, so as to avoid interference with screen assemblies 132,133. Further, as shown in FIGS. 9A to 9C, the stops 180 can be continuous and run along the length of the transverse structural member 182, or they can comprise a number of discrete portions spaced along both sides of the transverse member 182. Longitudinal shearing forces S caused by vibration of the basket and transferred to the cushion 177 are supported in both directions by the stops 180, which straddle the cushion 177, rather than by the rivets 178. As a result, the cushions 176 have a life determined by surface wear and not by rivet failure.

Returning to FIG. 1, an optional enhanced recovery system 200 can be fit to the latter screen assemblies of the lower deck 135. An extraction system 202 and receiving tray 206 can be applied and sealably fit to the last screen assembly or screen assemblies 133. In one embodiment, a vacuum system 203 is applied for encouraging recovery of fluids to the receiving tray 206. In another embodiment, a pulsing vacuum (not shown) is applied for drawing additional fluid from the last of the mud traversing the lower screen assemblies 133.

In this embodiment, fluid passing the first two of the lower screen assemblies 133,133 is directed to the base fluid pan for direction back to the system for reuse therein. The enhanced recovery system 200, applied to the last screen assembly 133, recovers fluid and can also be directed back to the system or, depending on the mud quality (such as if it contains weighting materials), the recovered fluid and be directed to a centrifuge or other separating device for further removal of fine particles.

Also shown in FIG. 5A, as seen on the opposing side wall 122, cleanout ports 126 for viewing and cleaning access may be installed. The ports 126 are angled downward and inward so that they can remain open at all times for inspection and access, yet without leaking fluids therethrough during normal operations.

In another embodiment, the basket may comprise more than two decks. Each deck would include slides, transverse support members spaced along the slides, angled supports above the slides, screening assemblies secured to the slides by wedges, longitudinal and transverse cushions secured to the slides and transverse support members, respectively, and an energy absorbing plate at the proximal end of the deck. A deflector plate 116, as described above, would extend underneath at least one of the decks. In a typical embodiment, the screen assemblies of the uppermost deck would comprise of the coarsest screening material, with the screening material becoming finer with each subsequent lower deck.

Existing single and dual deck shale shakers may be retrofit to provide the same benefits as the shaker described herein. For example, a single deck shale shaker may be retrofit to become a dual deck shaker by adding the components described above to provide a second deck with energy absorbing plates at the proximal ends of both decks, and a deflector plate to extend underneath a portion of the upper deck. An existing multi-deck shaker may be retrofit by removing the trays running underneath the upper decks and installing deflector plates to extend underneath each upper deck as described above, thereby providing the existing shaker with the weight-saving qualities of the shaker described herein.

While the apparatus and method have been described in conjunction with the disclosed embodiments which are set forth in detail, it should be understood that this is by illustration only and the method and apparatus are not intended to be limited to these embodiments. On the contrary, this disclosure is intended to cover alternatives, modifications, and equivalents which will become apparent to those skilled in the art in view of this disclosure.

What is claimed is:

1. A dual deck vibratory shaker for separating solids from drilling mud, comprising:
   a basket having a proximal end and a distal end;
   a vibratory motor configured to vibrate the basket;
   a first upper slide and first lower slide located on a first side wall of the basket, and a second upper slide and second lower slide located on a second side wall of the basket, the first and second upper slides running along a first plane and the first and second lower slides running along a second plane;
   an upper deck having a length, and extending from the proximal end to the distal end, comprising one or more removable upper screen assemblies on the first and second upper slides;
   a lower deck extending from the proximal end to the distal end, comprising one or more removable lower screen assemblies on the first and second lower slides;
   a deflector plate extending from the first side wall and the second side wall underneath the first half of the length of the upper deck, or a part thereof, said deflector plate positioned to receive drilling fluid from the upper deck and to deliver the drilling fluid to the lower deck at the proximal end;

one or more transverse support members, disposed underneath the upper deck and the lower deck, having a length, and extending from the first side wall to the second side wall of the basket;

at least one transverse cushion having a first height and secured to the one or more transverse support members; and stops protruding vertically from both sides of the one or more transverse supporting members and extending along at least a portion of the length of the one or more transverse supporting members, said stops having a second height that is lower than the first height.

2. The vibratory shaker of claim 1 further comprising a first energy absorbing plate at the proximal end for receiving the drilling mud and directing the mud onto the one or more screen assemblies of the upper deck.

3. The vibratory shaker of claim 1, wherein a first of the one or more upper screen assemblies located nearest the proximal end is vertically higher than the remaining one or more upper screen assemblies.

4. The vibratory shaker of claim 3 wherein the first of the one or more upper screen assemblies is higher by a height of about one screen height.

5. The vibratory shaker of claim 1, wherein the deflector plate directs the drilling fluid onto a second energy absorbing plate located at the proximal end of the basket, before the drilling fluid is directed onto the lower deck.

6. The vibratory shaker of claim 1, wherein the deflector plate extends underneath the first third of the length of the upper deck, or a part thereof.

7. The vibratory shaker of claim 1 wherein the upper deck comprises three removable upper screen assemblies, and wherein the deflector plate extends underneath the first screen assembly located nearest the proximal end, or a part thereof.

8. The vibratory shaker of claim 1, wherein the stops are continuous along the length of the one or more transverse supporting members.

9. The vibratory shaker of claim 1, wherein the stops are comprised of two or more discrete portions disposed along the length of the one or more transverse supporting members.

10. The vibratory shaker of claim 1, further comprising a vacuum system fit to the one or more lower screen assemblies on the first and second lower slide.

11. A vibratory shaker for separating solids from returned drilling mud, comprising:
 a basket having a proximal end and a distal end;
 a vibratory motor configured to vibrate the basket;
 a first slide located on a first side wall of the basket, and a second slide located on a second side wall of the basket, the first and second slides running along a first plane; and
 one or more upper transverse support members extending from the first side wall to the second side wall of the basket and underneath the first plane; and
 stops protruding vertically from both sides of the one or more upper transverse supporting members and extending along at least a portion of the length of the one or more upper transverse supporting members, the stops having a first height.

12. The vibratory shaker of claim 11 further comprising a third slide located on the first side wall of the basket below the first slide, and a fourth slide located on a second side wall of the basket below the second slide, the third and fourth slides running along a second plane that is below the first plane;
 one or more lower transverse support members extending from the first side wall to the second side wall of the basket and underneath the second plane; and
 stops protruding vertically from both sides of the one or more lower transverse supporting members and extending along at least a portion of the length of the one or more lower transverse supporting members.

13. The vibratory shaker of claim 11, wherein the stops are continuous along the length of at least one of the upper and/or lower transverse supporting members.

14. The vibratory shaker of claim 11, wherein the stops are comprised of two or more discrete portions disposed along the length of at least one of the upper and/or lower transverse supporting members.

15. The vibratory shaker of claim 11 further comprising at least one transverse cushion having a second height that is higher than the first height secured to at least one of the upper and/or lower transverse support members.

16. A method for retrieving drilling fluid from returned drilling muds using the dual deck vibratory shaker of claim 1, comprising:
 securing the one or more removable upper screen assemblies to the upper deck and securing the one or more removable lower screen assemblies to the lower deck of the basket of the vibratory shaker;
 feeding the returned drilling mud onto the upper deck at the proximal end of the vibratory shaker;
 agitating the basket to separate solids and fluids of the returned drilling mud and direct the solids toward the distal end of the shaker;
 deflecting a first portion of the fluids which flow through the upper deck towards the proximal end of the shaker and onto the lower deck;
 collecting drilling fluid which flows through the lower deck; and
 retrieving the drilling fluid from the vibratory shaker.

17. The method of claim 16, wherein the deflecting step further comprises allowing a second portion of the fluids which flow through the upper deck to fall directly onto the lower deck.

18. The method of claim 16, wherein the feeding step further comprises directing the drilling mud onto a first energy absorbing plate before it is delivered onto the upper deck.

19. The method of claim 16, wherein the deflecting step further comprises directing the first portion of the fluids onto a second energy absorbing plate before it is delivered onto the lower deck.

20. The method of claim 16, further comprising using a vacuum system to draw fluids through the removable lower screen assemblies of the lower decks.

* * * * *